(12) United States Patent
Jang

(10) Patent No.: US 7,920,861 B2
(45) Date of Patent: Apr. 5, 2011

(54) METHOD FOR OPERATING MOBILE COMMUNICATION TERMINAL, MOBILE COMMUNICATION SYSTEM, AND METHOD FOR PROVIDING CONTENTS THEREOF

(75) Inventor: Jin Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 668 days.

(21) Appl. No.: 11/929,723

(22) Filed: Oct. 30, 2007

(65) Prior Publication Data
US 2008/0102827 A1    May 1, 2008

(30) Foreign Application Priority Data

Oct. 31, 2006    (KR) .................. 10-2006-0106459

(51) Int. Cl.
*H04W 4/00*    (2009.01)
(52) U.S. Cl. .................. 455/432.1; 455/418; 455/414.1; 455/558; 455/550.1

(58) Field of Classification Search ............... 455/414.1, 455/432.1–435.3, 558, 550.1–55.1, 425, 455/418–420; 235/492; 704/231, E15.019
See application file for complete search history.

(56) References Cited

U.S. PATENT DOCUMENTS

| | | | |
|---|---|---|---|
| 2004/0077337 A1* | 4/2004 | Vestergaard et al. | 455/414.1 |
| 2004/0192195 A1* | 9/2004 | Soga et al. | 455/11.1 |
| 2005/0131685 A1* | 6/2005 | Roth et al. | 704/231 |
| 2006/0223528 A1* | 10/2006 | Smith | 455/432.3 |

* cited by examiner

*Primary Examiner* — Kamran Afshar
(74) *Attorney, Agent, or Firm* — Birch, Stewart, Kolasch & Birch, LLP

(57) ABSTRACT

The present invention relates to a method for operating a mobile communication terminal, a mobile communication system, and a method for providing contents. The mobile communication system includes a mobile communication network and a mobile communication terminal for receiving a contents service through the mobile communication network. The mobile communication system is characterized by the mobile communication terminal that downloads contents data provided from a roamed mobile communication network and performs a contents service.

16 Claims, 5 Drawing Sheets

| plmn | |
|---|---|
| MCC | MNC |
| ITALY | VODAFORNE |
| ITALY | HUTCHESON |
| FRENCH | VODAFORNE |
| FRENCH | T-mobile |

METHOD FOR OPERATING MOBILE COMMUNICATION TERMINAL, MOBILE COMMUNICATION SYSTEM, AND METHOD FOR PROVIDING CONTENTS THEREOF

This Nonprovisional application claims priority under 35 U.S.C. §119(a) on Patent Application No. 10-2006-0106459 filed in Korea on Oct. 31, 2006, the entire contents of which are hereby incorporated by reference.

BACKGROUND OF THE INVENTION

1. Field of the Invention

The present invention relates to a method for operating a mobile communication terminal, a mobile communication system, and a method for providing contents and, more particularly, to a mobile communication system and a packet communication method thereof, which enable a mobile communication terminal to perform packet-communication with a roaming mobile communication network or to receive contents provided from the roaming mobile communication network.

2. Description of the Background Art

A mobile communication terminal receives various communication services by being connected to a mobile communication network provided from a service provider. The communication service means not only a telephone service but also various supplementary services which are currently provided or will be provided from a service provider.

Due to the expansion of mobile communication system market that provides mobile communication services to mobile communication terminals, the service provider provides various multimedia services lately. The users of the mobile communication terminals have been popularly using such multimedia services.

If a user of a mobile communication terminal connected to a mobile communication network in one area moves to the other area, the mobile communication terminal must roam to a mobile communication network in the moved area in order to receive a related communication service from the moved area.

Although a mobile communication terminal roams to a roaming mobile communication network, the mobile communication terminal has to be connected to the contents server of the previous mobile communication network which was connected before roaming in order to receive the supplementary contents service. Therefore, the mobile communication terminal cannot receive contents services of the roaming mobile communication network although the mobile communication terminal can access to the contents server of the previous mobile communication network after the mobile communication terminal roams to the roaming mobile communication network.

SUMMARY OF THE INVENTION

Accordingly, an aspect of the present invention is to solve at least the problems and disadvantages of the background art. In accordance with an aspect of the present invention, a mobile communication system including a mobile communication network and a mobile communication terminal for receiving a contents service through the mobile communication network is characterized by the mobile communication terminal that downloads contents data provided from a roamed mobile communication network and performs a contents service.

In accordance with another aspect of the present invention, a method for providing contents of a mobile communication system, includes inputting a command of using a contents service to a mobile communication terminal, and executing a contents service by downloading contents data provided from a roaming mobile communication network when the mobile communication terminal roams to the roaming mobile communication network In accordance with still another aspect of the present invention, a method for providing contents of a mobile communication system includes confirming whether the mobile communication terminal roams to a roaming mobile communication network or not at a mobile communication terminal, connecting to an over-the-air (OTA) server or a firmware over-the-air (OTA) server which stores available contents server connection addresses of mobile communication networks where the mobile communication terminal can be connected to if the mobile communication terminal roams to the roaming mobile communication network, and searching a contents server connection address of a currently roamed mobile communication network among the contents server connection addresses stored in the OTA server or the FOTA server, and overwriting the searched contents server connection address as a contents server connection address to access when a command of using a contents service inputs.

In accordance with further still another aspect of the present invention, a method of operating a mobile communication terminal includes confirming whether the mobile communication terminal roams to a roaming mobile communication network or not, searching a contents server connection address of a currently roamed mobile communication network among stored contents server connection addresses if the mobile communication terminal roams to the roaming mobile communication network, and downloading contents data by connecting to the contents server of the roaming mobile communication network using the searched contents server connection address.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

It is an object of the present invention to provide a method for operating a mobile communication terminal, a mobile communication system, and a method for providing contents, which enables a mobile communication terminal to connect a contents server of a roaming mobile communication network in order to enable a user of a mobile communication terminal to receive a contents service provided from the roaming mobile communication network.

Hereinafter, a method for operating a mobile communication terminal, a mobile communication system, and a method for providing contents according to an embodiment of the present invention will be described with reference to accompanying drawings.

Figure 1:
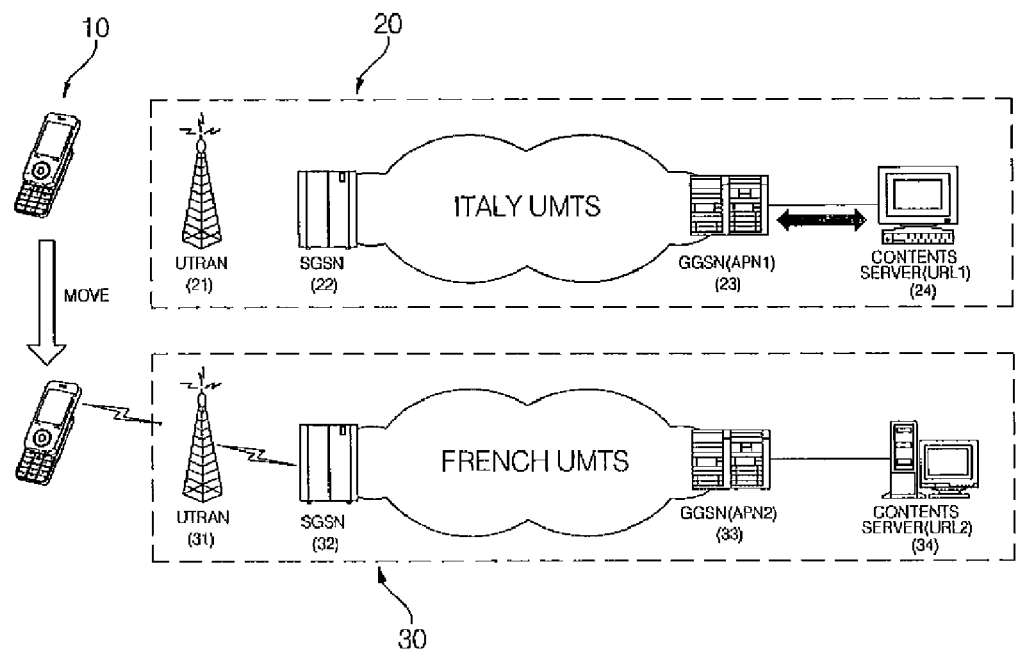
FIG. 1 is a diagram illustrating a mobile communication system in accordance with a first embodiment of the present invention.

FIG. 1 is a diagram illustrating a mobile communication system in accordance with a first embodiment of the present invention;

As shown in FIG. 1, a mobile communication terminal 10 is connected to a mobile communication network 20 through a service provider of a first area, for example, Italy, and receives a mobile communication service through the connected mobile communication network 20. The mobile communication network 20 may employ a $2^{nd}$ generation (2G) or $3^{rd}$ generation (3G) International standard, or another standard. In the present embodiment, a mobile communication network employing $3^{rd}$ generation partnership project (3GPP) will be described as an example. However, the present invention is not limited thereto. The present invention may be applied to any mobile communication networks employing another standard.

As shown in FIG. 1, the mobile communication network 20 includes a UTRAN 21 that is a base station, a SGSN 22 and a GGSN 23 for enabling data communication in a universal mobile telecommunication system (UMTS) network, and a contents server 24 for providing contents. Herein, the UTRAN stands for UMTS terrestrial radio access network, and the SGSN stands for a serving GPRS support node where GPRS means a general packet radio service.

The mobile communication terminal 10 is connected to the contents server 24 of the mobile communication network 20 so as to receive a contents service from the contents server 24. Herein, the contents service means various supplementary services that a user can receive with a telephone service.

As a currently available contents service, a service for downloading contents data through packet communication and using the downloaded contents data is provided to a user. For example, a user can use the contents service to check current stock prices. Also, a user can download a web browser or a JAVA game through the contents service. However, it is obvious to those skilled in the art that the contents service includes various communication types of data services that will be provided through future mobile communication networks.

The mobile communication terminal 10 must have information about the name of the GGSN 23 which is an access point in order to use data service through packet communication. The name of the GGSN 23 is referred as an access point name (APN). The mobile communication terminal 10 must pass through the GGSN 23 having an APN1 in order to access the content server 24. A contents server connection address is constituted of the APN1. Therefore, if a mobile communicate terminal can access the contents server using only an APN, the contents server connection address is formed of only APN. If a mobile communication terminal needs a universal resource locator (URL) of a contents server as well as an APN thereof, the contents server connection address is constituted of the APN and the URL.

The mobile communication terminal 10 receives a mobile communication service through the mobile communication network 20 at the first area. The mobile communication terminal 10 is connected to the contents server 24 using a contents server connection address stored in the mobile communication terminal 10 or a contents server connection address provided as a default address from the mobile communication network 20 and downloads contents from the contents server 24 through packet communication.

After the mobile communication terminal 10 moves to a second area, for example, France, the mobile communication terminal 10 cannot receive a mobile communication service through the mobile communication network 20 that controls the first area. Therefore, the mobile communication terminal roams to a mobile communication network 30 in order to receive a mobile communication service through a mobile communication network 30 that controls the second area. The mobile communication network 30 to which the mobile communication 10 roams in order to receive the mobile communication service is referred as a roaming mobile communication network 30. The roaming mobile communication network 30 includes a UTRAN 31, a SGSN 32, a GGSN 33, and a contents server 34.

In the related art, a mobile communication terminal 10 performs packet communication still through the APN1 that is the GGSN 23 although the mobile communication terminal 10 receives a mobile communication service through the roaming mobile communication network 30. Therefore, the mobile communication terminal 10 receives contents services provided from the contents server 24 of the mobile communication network 20 that controls the first area.

In the present embodiment, the mobile communication terminal 10 can access contents provided through a contents server 34 of the roaming mobile communication network through an APN2 that is a GGSN 33.

Figure 2:
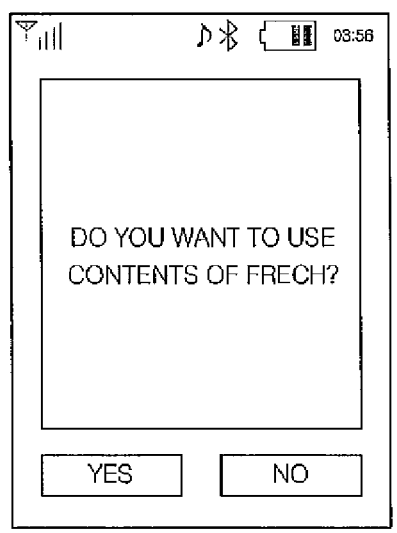
FIG. 2 is a diagram illustrating a screen displayed on a display unit of a mobile communication terminal shown in FIG. 1.

That is, if the mobile communication terminal 10 moves from the first area to the second area as shown in FIG. 1, the mobile communication terminal 10 roams to the roaming mobile communication network 30 in order to receive a mobile communication service through the roaming mobile communication network 30. If a user of the mobile communication terminal 10 wants to receive a data service after roaming, the mobile communication terminal 10 displays a contents server selection window on a display unit as shown in FIG. 2 in order to enable the user to select one of contents servers to connect.

If a user selects 'yes' through the contents server selection window, the mobile communication terminal 10 is connected to the contents server 34 of the roaming mobile communication network 30. Therefore, the contents server selection window may be referred as a contents server connection command window.

If the user wants to receive a contents service from the contents server 34 of the roaming mobile communication network 30 that covers a French area, the user inputs a command for connecting the contents server 40 of the roaming mobile communication network through the contents server selection window. As a result, the user can download data from the contents server 40 using the mobile communication terminal 10 through packet communication with the roaming mobile communication network. If the user selects 'no', the mobile communication terminal 10 is connected to the contents server 24 of the previous mobile communication network 20.

In the first embodiment, the mobile communication terminal 10 includes the APN2, which is a contents server connection address of the GGSN 33 in the roaming mobile communication network 30. Therefore, if the user selects 'yes' in FIG. 2, the mobile communication terminal 10 searches a contents server connection address of a current roaming mobile communication address among various contents server connection addresses stored in a memory thereof and accesses a contents server based on the searched address.

Figures 3, 4:
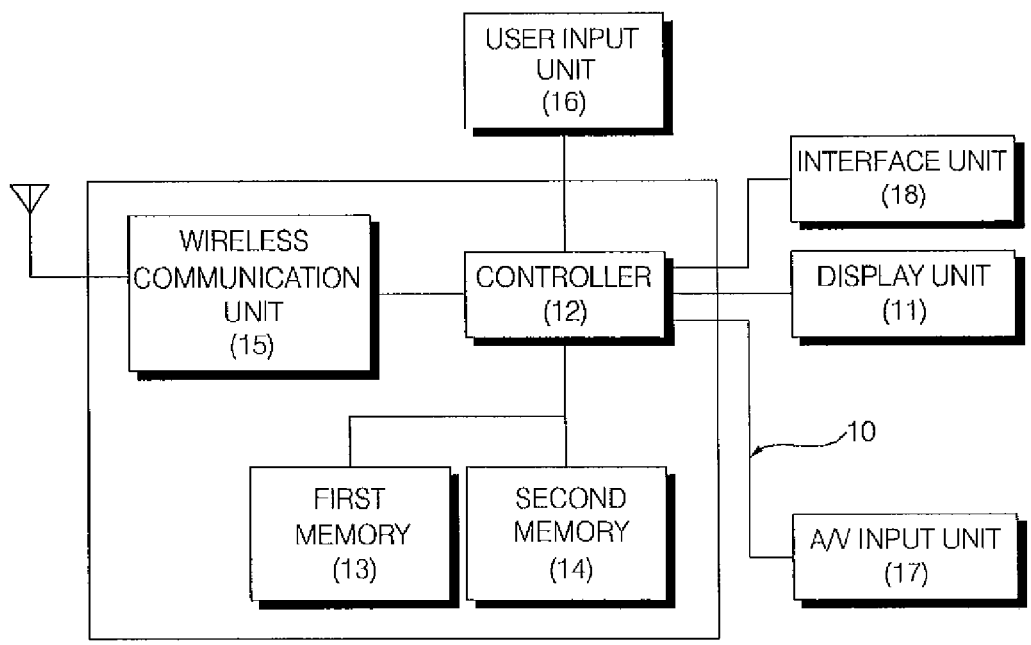
FIG. 3 is a diagram illustrating a table stored in a first memory of a mobile communication terminal shown in FIG. 1.
FIG. 4 is a block diagram illustrating a mobile communication terminal shown in FIG. 1.

FIG. 3 is a diagram illustrating a table stored in a first memory of a mobile communication terminal shown in FIG. 1. The table stores network related information including information about connectable mobile communication networks. The table also includes information about MCC and MNC by nations and providers.

As shown, the network related information includes information about service providers by nations, which provide services through mobile communication networks. When a mobile communication terminal moves from a mobile communication network of one provider to another mobile communication network of the other provider, a mobile communication terminal can be aware of a currently roamed mobile communication network through the table.

Therefore, the mobile communication terminal can read a contents server connection address matched to a currently roamed mobile communication network with reference to the table and can access the contents server based on the read contents server connection address.

In the first embodiment, the mobile communication terminal may automatically search a contents server connection address of the roaming mobile communication network without the participation of the user after the mobile communication terminal roams. In this case, the mobile communication terminal can be connected to a contents server of a roaming mobile communication network using the searched contents server connection address without additionally searching a contents server connection address when the user inputs a command of using a contents service after roaming. That is, the process of displaying the contents server selection window and the process of selecting one of contents servers through the displayed window can be omitted.

Unlikely, the process for searching a contents server connection address of a roaming mobile communication network may start when a user inputs a command of using a contents service to the mobile communication terminal after the mobile communication terminal roams to the roaming mobile communication network. In this case, the user searches a matched contents server connection address when the content service using command inputs and tries to connect a contents server of a roaming mobile communication network using the searched contents server connection address.

Finally, when a user inputs a command of using a contents service while or after roaming, a mobile communication terminal asks the user whether contents of the roaming mobile communication network will be used or not. If the user selects 'yes', the mobile communication terminal may search a contents server connection address and tries to connect the contents server based on the searched contents server connection address.

As described above, in the first embodiment, the mobile communication terminal may be connected to the contents server of the roaming mobile communication network by automatically performing a process of searching a contents server connection address when the command of using a contents service inputs while or after roaming. Or, the mobile communication terminal may be connected to the contents server by displaying a contents server selection window when the command of using a contents service inputs while or after roaming, selecting the contents server of the roaming mobile communication network through the displayed selection window, and performing a process of searching a connection address of the selected contents server.

FIG. 4 is a block diagram illustrating a mobile communication terminal 10 in accordance with the first embodiment of the present invention.

Referring to FIG. 4, the mobile communication terminal 10 includes a wireless communication unit 15 for transmitting and receiving data to/from other devices through an antenna in wireless manner, a display unit 11, a controller 12 for controlling screens displayed on the display unit 11, a user input unit 16, a A/V input unit, and a interface unit 18. The controller 12 continuously confirms whether the mobile communication terminal 10 roams or not. If a data service using command inputs after roaming, the controller 12 displays the contents server selection window on the display unit 11.

The user input unit 16 generates input data responsive to user manipulation of an associated input device or devices. Examples of such devices include a keypad, a dome switch, a touchpad (e.g., static pressure/capacitance), a jog wheel and a jog switch. Audio/video (A/V) input unit 17 is configured to provide audio or video signal input to the mobile terminal.

The interface unit 18 is often implemented to couple the mobile terminal with external devices. Typical external devices include wired/wireless headphones, external chargers, power supplies, storage devices configured to store data (e.g., audio, video, pictures, etc.), earphones, and microphones, among others If a user selects 'yes', the mobile communication terminal searches a connection address matched to a current roaming mobile communication network by accessing a first memory 13 storing information about contents server connection addresses which are various APNs, and overwrites the searched information to a second memory 14 that stores a contents server connection address that is an address of a contents server to access for a related contents service. Then, the mobile communication terminal performs packet communication based on the contents server connection address stored in the second memory.

The first memory 13 and the second memory 14 are divided only theoretically in the present embodiment. The first memory 13 and the second memory 14 may be embodied as the same storage medium or different storage mediums.

A method of providing contents of a mobile communication system according to the first embodiment of the present invention will be described with reference to FIG. 5, hereinafter.

Figure 5:
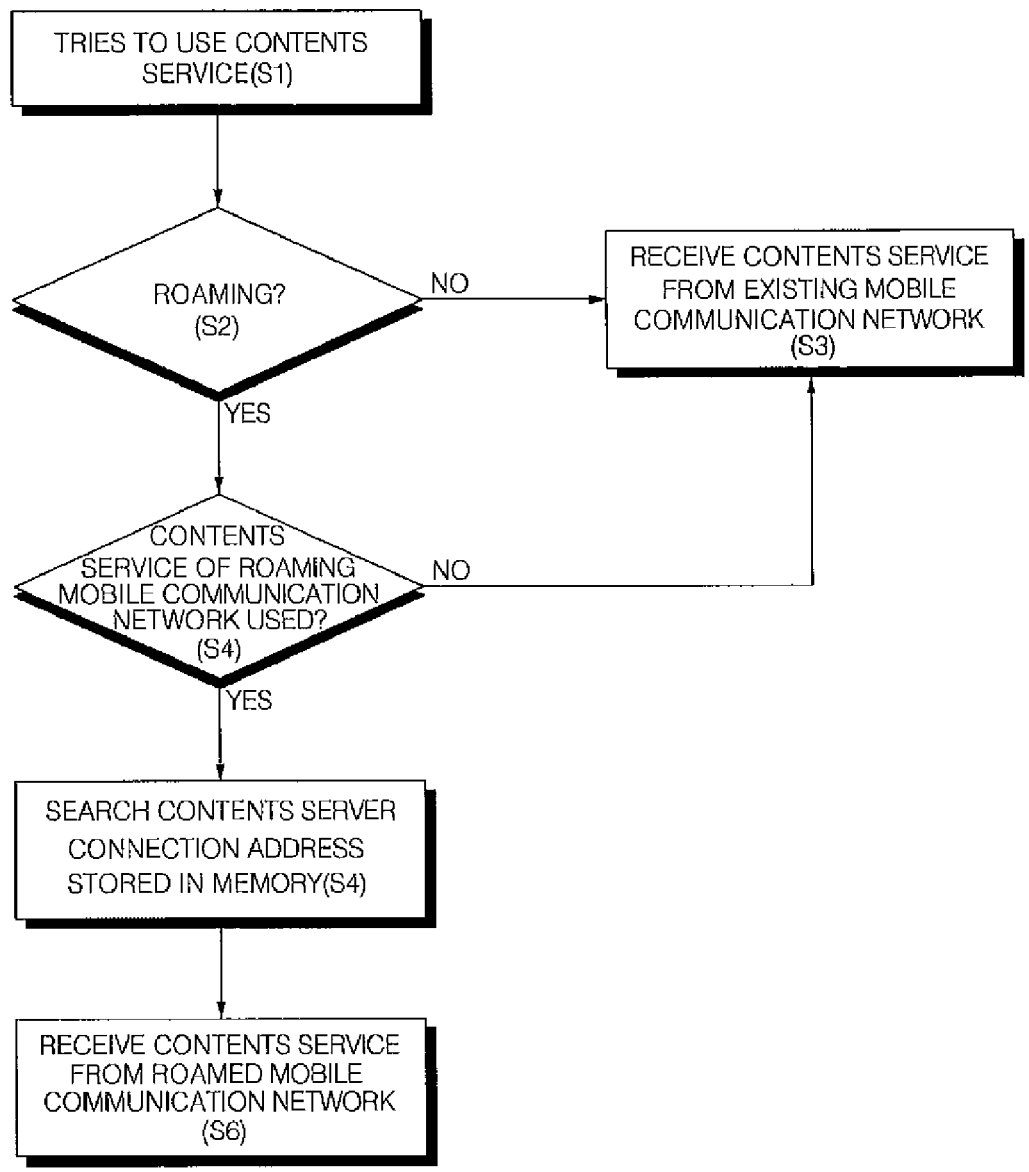
FIG. 5 is a flowchart of a method of providing contents of a mobile communication terminal in accordance with an embodiment of the present invention.

Referring to FIG. 5, if a user inputs a data service using command in operation S1, a controller 12 confirms whether a mobile communication terminal roams to a roaming mobile communication network or not in operation S2.

If the mobile communication terminal 10 confirms that the mobile communication terminal 10 roamed to the current roaming mobile communication network 30, the mobile communication terminal 10 displays a window for selecting a contents server, which is a contents server connection command window, in order to receive contents on the display unit 11 of the mobile communication terminal 10 in operation S4.

Therefore, the user can input a connection command to connect the mobile communication terminal 10 to the contents server 34 of the roaming mobile communication network 30. If the user inputs the connection command, the controller 12 searches the contents server connection address of the current roaming mobile communication network 30 by accessing the memory 13 storing the information related to a contents server connection address in operation S5. Then, the mobile communication terminal 10 transmits a packet communication request signal to the roaming mobile communication network 30 based on the searched contents server connection address.

If the roaming mobile communication network admits the packet communication request, the mobile communication terminal 10 is connected to the contents server 34 of the roaming mobile communication network 30 and downloads contents from the contents server 34 in operation S6.

If the mobile communication terminal did not roam, the mobile communication terminal accesses a contents server of the current mobile communication network and receives a contents service therefrom in operation S3.

In the method for providing contents of a mobile communication system according to another embodiment of the present invention, a contents server connection address may be overwritten as soon as the mobile communication terminal roams to the roaming mobile communication network as described above.

Figure 6:
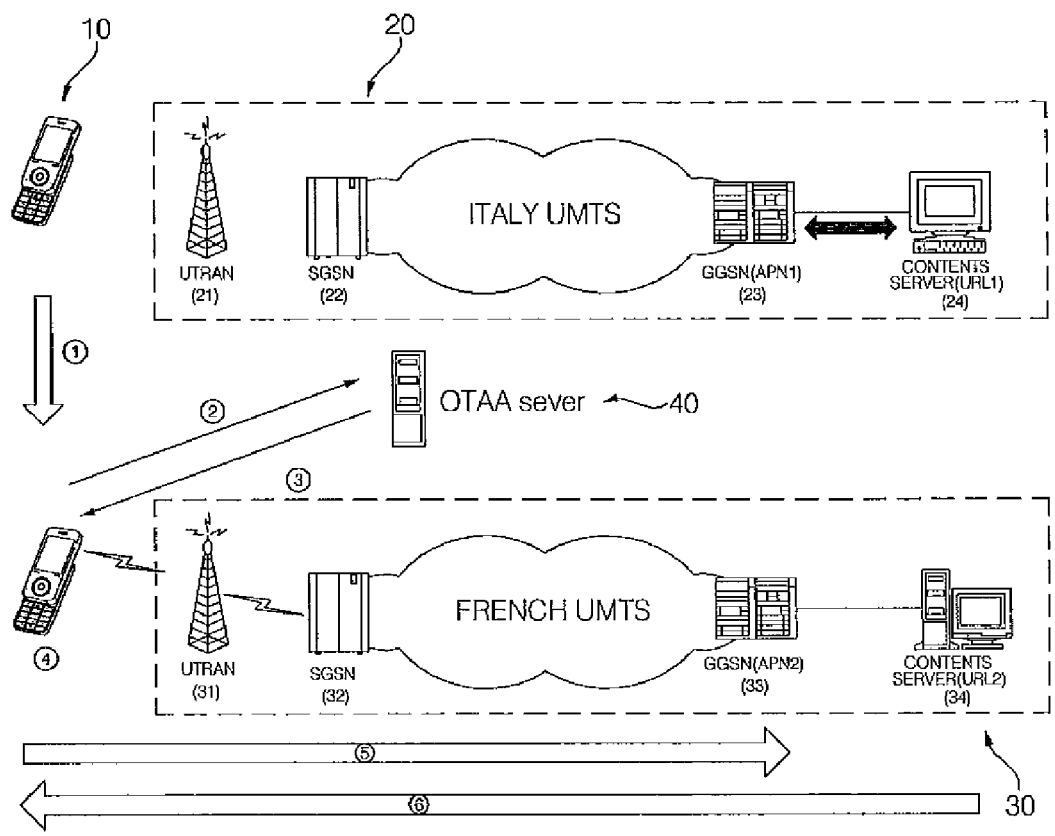
FIG. 6 is a diagram illustrating a mobile communication system in accordance with a second embodiment of the present invention.

FIG. 6 is a diagram illustrating a mobile communication system in accordance with the second embodiment of the present invention.

As shown in FIG. 6, the mobile communication terminal 10 can be provided with information about a contents server connection address through an over-the-air (OTA) server 40 although the mobile communication terminal does not internally store information about various contents server connection addresses in the mobile communication system according to the present embodiment.

That is, if the mobile communication terminal 10 tries to use a data service after the mobile communication terminal 10 moves from the first area to the second area in operation S1, the mobile communication terminal confirms whether the mobile communication terminal roams to a roaming mobile communication network or not at first. If the mobile communication terminal confirms that the mobile communication terminal uses a data service after roaming, the display unit of the mobile communication terminal displays a contents server selection window similarly to the mobile communication terminal according to the first embodiment. In the present embedment, the mobile communication terminal may also automatically perform following operations if the mobile communication terminal roams to the roaming mobile communication network.

If the user inputs a connection command to connect the mobile communication terminal to the contents server 34 of the roaming mobile communication network 30, the mobile communication terminal 10 requests OTA data to the OTA server 40 in operation S2. The OTA data may be constituted of various data that a terminal needs. In general, the OTA data includes information about the contents server connection address of the roaming mobile communication network 30 where a current mobile communication terminal roams to.

If the OTA server 40 transmits information about an APN2 which is a contents server connection address in operation S3, the mobile communication terminal 10 overwrites the transmitted APN2 information on stored APN1 information in operation S4.

Then, the mobile communication terminal 10 tries to perform packet-communication with the roaming mobile communication network 30 based on the APN2 related information. At first, the mobile communication terminal 10 transmits a packet communication request signal to a GGSN 33 of the roaming mobile communication network 30 in operation S5. Such a request is referred as packet data protocol (PDP) context activation request.

If the roaming mobile communication network 30 admits packet-communication, the mobile communication terminal 10 downloads contents through the contents server 34 of the roaming mobile communication network 30 in operation S6.

In the second embodiment, the mobile communication terminal 10 basically receives APN2 that is a contents server connection address or/and URL2 that is URL information of the contents server 34 through communicating with the OTA server 40 when a user wants to connect the mobile communication terminal 10 to the contents server 34 of the roaming mobile communication network 30 according to the user selection.

However, the mobile communication terminal may be set to be automatically provided with the APN2/URL2 information from the OTA server 40 and receive a data service through the contents server 34 if it necessary or according to a user selection when a mobile communication terminal moves from the first area to the second area.

Figure 7:
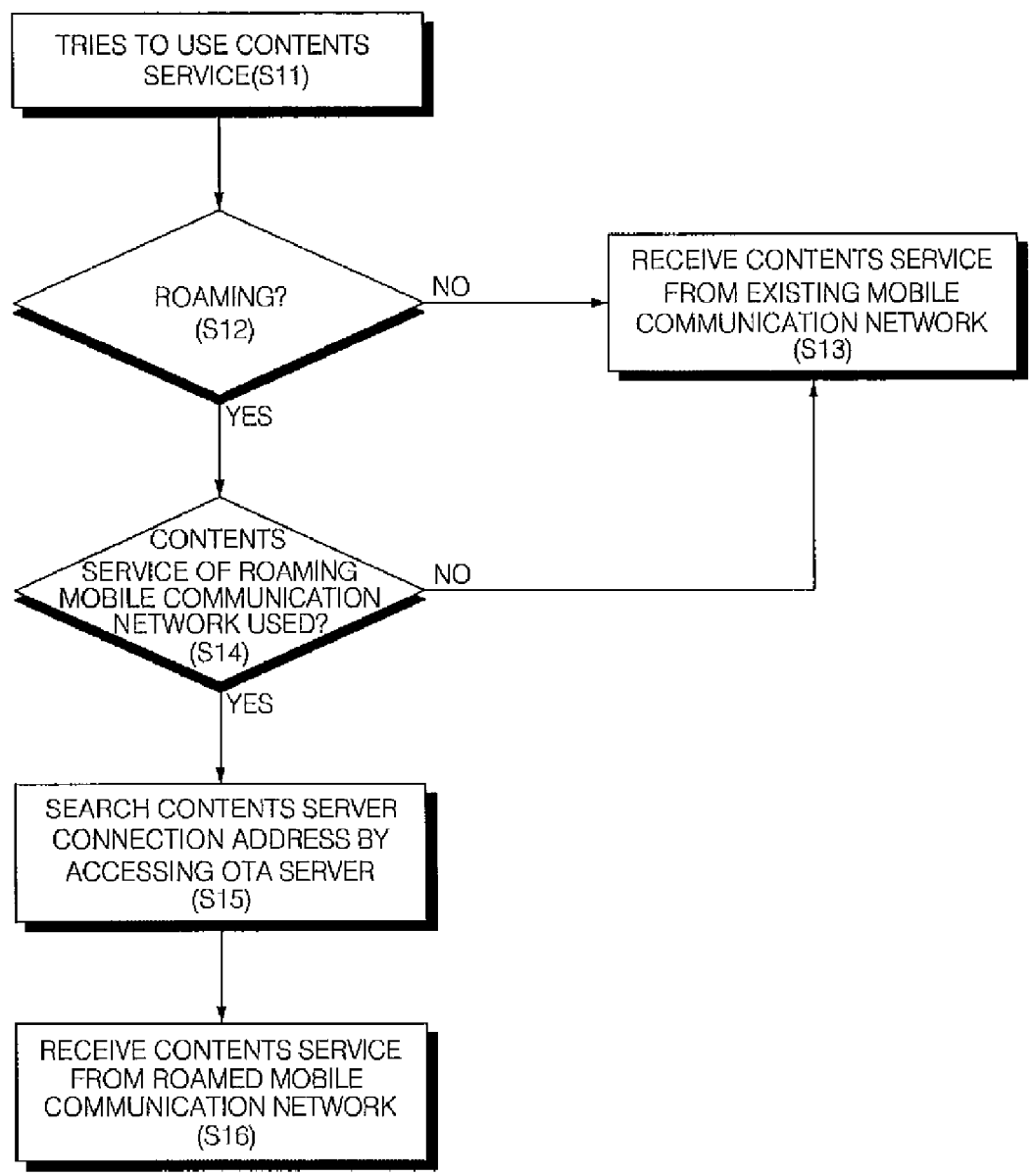
FIG. 7 is a flowchart illustrating a method for providing contents of a mobile communication system in accordance with a third embodiment of the present invention.

FIG. 7 is a flowchart illustrating a method for providing contents of a mobile communication system in accordance with the third embodiment of the present invention.

Referring to FIG. 7, if a user of a mobile communication terminal inputs a command of using a contents service in operation S11, the mobile communication terminal confirms whether the mobile communication terminal roams to a roaming mobile communication network or not in operation S12. If the mobile communication terminal confirms that the mobile communication terminal roams to the roaming mobile communication network, the mobile communication terminal asks a user to use a contents service of the roaming mobile communication network in operation S14.

If the user wants to use the contents service of the roaming mobile communication network, the mobile communication terminal downloads server connection address information by accessing an over-the-air (OTA) server in operation S15. And, the mobile communication terminal receives a contents service by accessing the contents server of the roaming mobile communication network based on the received server connection address information in operation S16.

If the mobile communication terminal did not roam, or if the user wants to use the contents service of the existing mobile communication network, the mobile communication terminal is connected to the existing mobile communication network and receives the contents service of the existing mobile communication network in operation S13.

As a method for providing contents of a mobile communication system according to the fourth embodiment of the present invention, a mobile communication terminal may be connected to an over-the-air (OTA) server and downloads a contents server connection address from the OTA server as soon as the mobile communication terminal roams to a roaming mobile communication network.

Although the present embodiment was described using the OTA server, a firmware over-the-air (OTA) server may be used to provide a contents server connection address in another embodiment of the present invention. Also, a mobile communication terminal may download various language data when the mobile communication terminal downloads the contents server connection address so as to enable a user to receive a contents service in a language environment of a corresponding nation.

In this case, a user may input a language change command or a mobile communication terminal may be set to automatically change the language environment of the mobile communication terminal to the downloaded language when the contents service of the roaming mobile communication network is provided.

As described above, the method for operating a mobile communication terminal, the mobile communication system, and the method for providing contents thereof according to embodiments of the present invention enable a mobile communication terminal to access a contents server of a roaming mobile communication network when the mobile communication terminal roams to a mobile communication network of a corresponding area. Therefore, various contents services can be provided to a user of a mobile communication terminal.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A mobile communication system comprising:
    a mobile communication network; and
    a mobile communication terminal configured to receive a contents service from a first contents server through the mobile communication network, the mobile communication terminal including:
        a controller configured to access a second contents server of a roaming mobile communication network and to selectively download contents data from the first or second contents servers; and
        a first memory configured to store information about contents server connection addresses of the first and second contents servers,
    wherein the controller overwrites data related to the first contents server connection address with data related to the second contents server connection address on the first memory when the mobile communication terminal roams to the roaming mobile communication network or when a contents server input command is received after the mobile communication terminal roams to the roaming mobile communication network.

2. The mobile communication system of claim 1, wherein the mobile communication terminal further includes a second memory configured to store information about contents server connection addresses of available mobile communication networks for roaming.

3. The mobile communication system of claim 2, wherein the controller reads the data related to the second contents server connection address of the second contents server of the currently roamed mobile communication network among the contents server connection addresses stored in the second memory.

4. The mobile communication system of claim 1, further comprising:
    an over-the-air (OTA) server or a firmware over-the-air (OTA) server configured to store information about available contents server connection addresses for being connected by the mobile communication terminal.

5. The mobile communication system of claim 4, wherein the controller accesses the OTA server or the FOTA server, reads the second contents server connection address of the second contents server, and writes the read second contents server connection address for the second contents server on the first memory over the first contents server connection address for the first contents server.

6. The mobile communication system of claim 5, wherein the OTA server or the FOTA server stores language data usable in the mobile communication terminal.

7. The mobile communication system of claim 6, wherein the controller changes a language used in the mobile communication terminal by downloading the language data with the contents server connection address.

8. The mobile communication system of claim 1, wherein the mobile communication terminal further includes a display unit, and the controller displays a selection window on the display unit for selecting a contents server to access.

9. A method for providing contents of a mobile communication system, the method comprising:
    inputting a command using a contents service to a mobile communication terminal; and
    executing the contents service by downloading contents data provided from a roaming mobile communication network when the mobile communication terminal roams to the roaming mobile communication network,
    wherein the executing of the contents service includes connecting the mobile communication terminal to the contents server of the roaming mobile communication network, and
    wherein the connecting the mobile communication terminal to the contents server includes:
    confirming whether the mobile communication terminal roams to the roaming mobile communication network or not;
    searching a contents server connection address of a currently roamed mobile communication network among contents server connection addresses stored in the mobile communication terminal when the mobile communication terminal roams to the roaming mobile communication network; and
    connecting the mobile communication terminal to a contents server of the roaming mobile communication network using the searched contents server connection address.

10. The method of claim 9, wherein in the inputting the command, the command of using the contents service is a command of using a contents service provided from a roaming mobile communication network.

11. A method for providing contents of a mobile communication system, the method comprising:
    inputting a command using a contents service to a mobile communication terminal; and
    executing the contents service by downloading contents data provided from a roaming mobile communication network when the mobile communication terminal roams to the roaming mobile communication network,
    wherein the executing the contents service includes connecting the mobile communication terminal to the contents server of the roaming mobile communication network, and
    wherein the connecting the mobile communication terminal to the contents server includes:
    confirming whether the mobile communication terminal roams to the roaming mobile communication network or not;
    connecting to an over-the-air (OTA) server or a firmware over-the-air (OTA) server which stores available contents server connection addresses of mobile communication networks where the mobile communication can be connected to if the mobile communication terminal roams to the roaming mobile communication network;
    searching a contents server connection address of a currently roamed mobile communication network among the contents server connection addresses stored in the OTA server or the FOTA server; and connecting the mobile communication terminal to a contents server of the roaming mobile communication network using the searched contents server connection address.

12. The method of claim 11, wherein the executing the contents service further includes downloading language data stored in the OTA server or the FOTA server to the mobile communication terminal.

13. The method of claim 12, wherein the executing the contents service further includes changing a language environment of the mobile communication terminal to the downloaded language.

14. A method for providing contents of a mobile communication system, the method comprising:
  at a mobile communication terminal, confirming whether the mobile communication terminal roams to a roaming mobile communication network or not;
  at the mobile communication terminal, connecting to an over-the-air (OTA) server or a firmware over-the-air (OTA) server which stores available contents server connection addresses of mobile communication networks where the mobile communication terminal can be connected to if the mobile communication terminal roams to the roaming mobile communication network; and
  at the mobile communication terminal, searching a contents server connection address of a currently roamed mobile communication network among the contents server connection addresses stored in the OTA server or the FOTA server, and overwriting the searched contents server connection address as a contents server connection address to access when a command of using a contents service inputs.

15. The method of claim 14, further comprising:
downloading language data stored in the OTA server or the FOTA server to the mobile communication terminal.

16. The method of claim 15, further comprising:
changing a language environment of the mobile communication terminal to the downloaded language.

* * * * *